(12) United States Patent
Petch et al.

(10) Patent No.: US 6,243,372 B1
(45) Date of Patent: *Jun. 5, 2001

(54) METHODS AND APPARATUS FOR SYNCHRONIZATION IN A WIRELESS NETWORK

(75) Inventors: Byran K. Petch, Elbert; Charles L. Lindsay; Ryan N. Jensen, both of Monument, all of CO (US)

(73) Assignee: Omnipoint Corporation, Colorado Spring, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/749,105

(22) Filed: Nov. 14, 1996

(51) Int. Cl.$^7$ ...................................................... H04J 3/06
(52) U.S. Cl. ......................... 370/350; 370/324; 370/503; 375/145; 375/149; 375/356; 375/357; 455/502
(58) Field of Search .................................... 370/310, 315, 370/316, 324, 350, 503, 516, 522, 520; 375/343, 356, 357, 367, 371, 137, 145, 149; 455/502, 422

(56) References Cited

U.S. PATENT DOCUMENTS

| | | | |
|---|---|---|---|
| 3,825,899 | * 7/1974 | Haeberle et al. | 370/324 |
| 4,001,693 | 1/1977 | Stackhouse et al. | 325/58 |
| 4,231,114 | 10/1980 | Dolikian | 455/49 |
| 4,280,222 | 7/1981 | Flower | 375/38 |
| 4,355,388 | * 10/1982 | Deal, Jr. | 370/324 |
| 4,494,211 | 1/1985 | Schwartz | 364/571 |
| 4,630,291 | 12/1986 | Lankar et al. | 375/107 |
| 4,688,210 | 8/1987 | Eizenhöfer et al. | 370/18 |
| 4,696,051 | 9/1987 | Breeden | 455/33 |
| 4,713,631 | 12/1987 | Enderby et al. | 331/36 |
| 4,849,993 | * 7/1989 | Johnson et al. | 375/357 |
| 5,028,885 | 7/1991 | Voigt et al. | 331/1 |
| 5,103,459 | 4/1992 | Gihousen et al. | 375/1 |
| 5,109,393 | 4/1992 | Saegusa | 375/108 |
| 5,144,669 | * 9/1992 | Faulkner et al. | 370/516 |
| 5,195,091 | 3/1993 | Farwell et al. | 370/94.1 |
| 5,222,075 | 6/1993 | Richley | 375/1 |
| 5,239,671 | 8/1993 | Lindquist et al. | 455/33.1 |
| 5,245,634 | 9/1993 | Averbuch | 375/108 |
| 5,353,300 | 10/1994 | Lee et al. | 375/1 |
| 5,363,373 | 11/1994 | Nakahara et al. | 370/95.1 |
| 5,416,800 | 5/1995 | Frank | 375/239 |
| 5,416,808 | * 5/1995 | Witsaman et al. | 375/356 |
| 5,446,727 | 8/1995 | Bruckert et al. | 370/18 |
| 5,481,533 | 1/1996 | Honig et al. | 370/18 |
| 5,506,863 | 4/1996 | Meidan et al. | 375/202 |
| 5,528,597 | 6/1996 | Gerszberg et al. | 370/95.3 |
| 5,680,414 | * 10/1997 | Durrant et al. | 375/367 |

OTHER PUBLICATIONS

Omnipoint Corporation—Omniport IS–661–Based composite CDMA/TDMA PCS System Overview—Dated: Jun. 1995.

"Air Interface Considerations," Joint Experts Meeting, Rockwell Int'l. Nov. 9, 1992.

* cited by examiner

*Primary Examiner*—Douglas Olms
*Assistant Examiner*—Shick Hom
(74) *Attorney, Agent, or Firm*—Lyon & Lyon LLP (57) ABSTRACT

As part of a preferred communication protocol, base stations which are synchronized to a PSTN of a wireless communication network, periodically transmits a preamble. A remote detects the preamble and, upon verification of the data contained in the base station transmission, sets its counter to an initialized state based on the received preamble. An early/late analysis of each subsequently received base station timing pulse is used to adjust both the mobile station timing and to adjust the output frequency of the mobile station master clock and codec clock to effectively maintain end to end synchronization with the respective base station and the PSTN throughout the duration of an established communication link.

23 Claims, 5 Drawing Sheets

METHODS AND APPARATUS FOR SYNCHRONIZATION IN A WIRELESS NETWORK

FIELD OF INVENTIONS

The inventions herein pertain to the field of communication networks, including methods and apparatus for acquiring and maintaining synchronization in a wireless communication network.

BACKGROUND

In a typical wireless communication network, one or more base stations are selectively positioned within respective, defined geographic areas or cells, and are used to transmit and receive communication signals to and from, respectively, one or more remote stations, (e.g., mobile or cellular telephone handsets), located within the respective cell. In particular, the base stations act as both intermediary points by which a communication path may be periodically established and maintained with respective remote stations, as well as end points of a hierarchial stationary network, which also includes an overlay or backbone network, such as, e.g., a public switched telephone network ("PSTN").

A selected communication protocol defines a method in which the various remote stations can communicate with one or more base stations of the communication network, e.g., in order to place and receive telephone calls. The communication protocol will preferably provide air-channel agility between respective base stations and remote stations, while also providing a secure voice or data link. A fundamental concern of the selected communication protocol for a network is the ability of the remote stations to communicate with the base stations in a simple, flexible and rapid manner, e.g., so that a remote station is not required to wait to establish a communication path, and/or so that a hand-off of an active call between base stations in a mobile network is transparent to a respective remote station. In this respect, the ability to acquire and maintain synchronization between a base station and a mobile station is an important consideration. Further, network-wide synchronization should be established and maintained for optimal operation of a mobile communication network, e.g., to minimize interference problems otherwise caused by non-synchronized base and/or mobile station transmissions in the same, or adjacent, cell location(s).

For example, in U.S. patent application Ser. No. 08/284,053, assigned to the assignee of the present application and which is hereby fully incorporated herein by reference, a protocol for a wireless communication network is described for use with a wireless communication network, wherein each base station transmits over a set of time-division air channels, or time slots, by transmitting in time slots in sequence, referred to herein as an over the air loop. Each base station time slot polling transmission is followed by a first gap (or "guard time"), a remote station transmission (if a remote station attempts to communicate), and a second (guard time) gap, before the base station transmits over the next time slot. A remote station receiving a base station polling transmission in an (unoccupied) time slot, may then transmit information to the base station over that respective channel, e.g., to establish a communication link with that base station via the respective polling path. Each base station may thereby maintain communication with as many remote stations as there are available time slots in its over the air loop.

In accordance with this protocol, handoffs between base stations are preferably initiated by the respective mobile station, which monitors available time slots from the same and competing base stations during unused time slots. A mobile station may handoff within the same over the air loop to establish communication in a new time slot of the same base station, or may handoff in such a manner to establish communication within a over the air loop of a different base station. In the latter case, a "base station controller" may assist in transferring the call from one base station to another.

Successful operation of the aforedescribed protocol depends on the stability of respective internal base station and mobile station transmission timing. In particular, in order for respective base station and mobile station transmissions to stay locked to each other within the respective time slot interval(s), the mobile station transmission timing must be synchronized with the base station transmission timing. For example, in U.S. Pat. No. 4,494,211, issued to Schwartz, a synchronization system for a "master/slave" satellite pair is described whereby each satellite of the pair transmits timing signals synchronized to its own respective clock, receives the timing signals from the other satellite and independently measures the difference between the transmission and reception of the respective timing signals. The time difference measured by each satellite is then transmitted to the other, wherein each utilizes the respective time difference measurements to calculate the asynchronism between the respective clocks and the range between the satellites. Based on those calculations, the "slave" satellite clock is then adjusted so that the calculated asynchronism is reduced to within an acceptable difference. As can be seen, the Schwartz synchronization system is both complex and requires periodic signaling bandwidth in both directions dedicated to the transmission of clock signals and respective measurement calculations.

Thus, it would be advantageous to provide a method and network architecture for the simple and rapid acquisition and maintenance of synchronization between respective base stations and mobile stations of a mobile communication network, without adversely impacting over-the-air bandwidth or the robustness of an established communication path. It would be further advantageous to provide the capability in a mobile communication network for network-wide synchronization, including both "intra-network" synchronization, i.e., between respective elements of the mobile network itself, and "inter-network" synchronization, i.e., between the mobile network and a respective linking overlay network.

SUMMARY OF THE INVENTIONS

The present inventions provide methods and corresponding network architectures for acquiring and maintaining synchronization between discrete elements of a communication network and between a communication network and a linking overlay network, such as, e.g., a public switched telephone network ("PSTN") and achieving serial data synchronization from the overlay network to the serial audio/data interface in the remote station. As part of a preferred communication protocol, base stations which are synchronized to a PSTN of a wireless communication network periodically transmit a preamble. A remote detects the preamble and sets its counter to an initialized state based on the received preamble. An early/late analysis of subsequently received base station preambles is used to adjust both the remote station timing and to adjust the output frequency of the remote station master clock and codec clock to effectively maintain end to end synchronization with the respective base station and the PSTN throughout the duration of an established communication link.

In a preferred embodiment, each base station of a mobile communication network is provided with an adjustable master clock, which generates a respective base station clock signal. The base station clock signal is used to regulate a frame timing counter, which controls the timing for the respective transmission and reception of digital data frames within each time slot interval of the base station's over the air loop. In accordance with one aspect of the inventions, the base station master clock frequency is continually adjusted at a serial data rate level to match the serial data rate of the overlay network. By way of example, a low frequency component signal is derived from a higher frequency base station clock signal and compared to a reference signal derived from an incoming serial data link of an overlay PSTN network, such as, e.g., a T1 facility. A signal representing the phase difference between the low frequency signal and the reference signal is then used as a feedback adjustment to the base station master clock, i.e., so that the output frequency is increased or decreased, respectively, to minimize the phase difference. In this manner, the serial data rate of each base station of a mobile communication network becomes uniformly synchronized with the overlay network serial data rate.

As a measure to minimize cross-transmission interference between base station transmissions of adjacent cells, base stations of a communication network are preferably equipped with a GPS receiver, which resets frame timing counters of the base station to a particular state based upon the reception of a GPS pulse. Base stations of the communication network can thereby transmit and receive, synchronously, subject to, for example, the accuracy of the GPS signal received at the various base station locations and the accuracy of the respective base station master clocks within the selected GPS signal intervals.

In accordance with another aspect of a preferred embodiment of the inventions, remote stations of the wireless communication network are provided with an adjustable master clock, which generates a remote station clock signal having a nominal frequency the same as the base station master clocks of the communication network. The remote station clock signal can regulate a respective remote station frame timing counter and control the timing of the transmission and reception of data frames between the remote station and one or more base stations, e.g., within respective base station time slot interval(s).

As a part of a preferred communication protocol, base stations establish an over the air loop derived from the base station clock. The base stations periodically transmit a signal, including a proprietary preamble, at fixed positions in the over the air loop to define time slots. A remote station seeking to initiate contact with a base station evaluates received information until it detects the proprietary preamble. Upon detecting the proprietary preamble, the remote station produces an internal timing pulse, which synchronizes a correlator for processing the received information and the remote station's frame timing counter for transmitting and receiving information to and from the respective base station. In this manner, the remote station becomes initially synchronized with the respective base station, within the accuracy of the remote station's master clock.

For example, the remote station frame timing counter may establish a "timing window" (e.g., by counting a particular number of remote station clock periods) for receiving base station data frame transmissions initially within the same time slot as the first received base station transmission and then within one or more assigned time slots for maintaining an established communication link with the same, or another base station. Each successive base station data frame transmission includes a preamble at fixed positions within the over the air loop. The remote station produces a timing pulse upon detecting a preamble, which is used to adjust the occurrence of the ensuing timing window. One advantage of this aspect of the inventions is that a remote station may predict the arrival of base station transmissions with a remote station master clock accurate enough to maintain synchronization with the respective base station over a single over the air loop (e.g., 20 ms).

In accordance with yet another aspect of the inventions, the successive base station timing pulses are also used to continually adjust the actual remote station master clock output frequency to that of the respective base station clock throughout the duration of an established communication link—e.g., in a manner similar to the continual synchronization of the base station clock to the overlay network. The respective base and remote station transmissions are less likely to encroach beyond the guard time gaps following each respective time slot transmission interval, as may otherwise occur from a drift in one or both of the respective clock signal frequencies. Preferably, early/late adjustments to the remote station's timing counter and master clock frequency are made based on timing pulses received in base station transmission frames which pass an error check, e.g., such as a cyclic redundancy check (CRC), to minimize making false adjustments. Further, by employing the remote station master clock as a reference clock signal for synchronizing any other clocks of the mobile station, e.g., a vocoder clock, all remote station clocks may be effectively synchronized with a respective base station throughout the duration of an established communication link.

These and other objects, aspects, advantages and features of the present inventions will be more fully understood and appreciated by those skilled in the art upon consideration of the following detailed description of preferred embodiments, presented in conjunction with the accompanying drawings.

BRIEF DESCRIPTION OF THE DRAWINGS

The drawings illustrate both the design and utility of preferred embodiments of a communication network and its component elements embodying the present inventions, in which.

DETAILED DESCRIPTION OF THE PREFERRED EMBODIMENT

Figure 1:
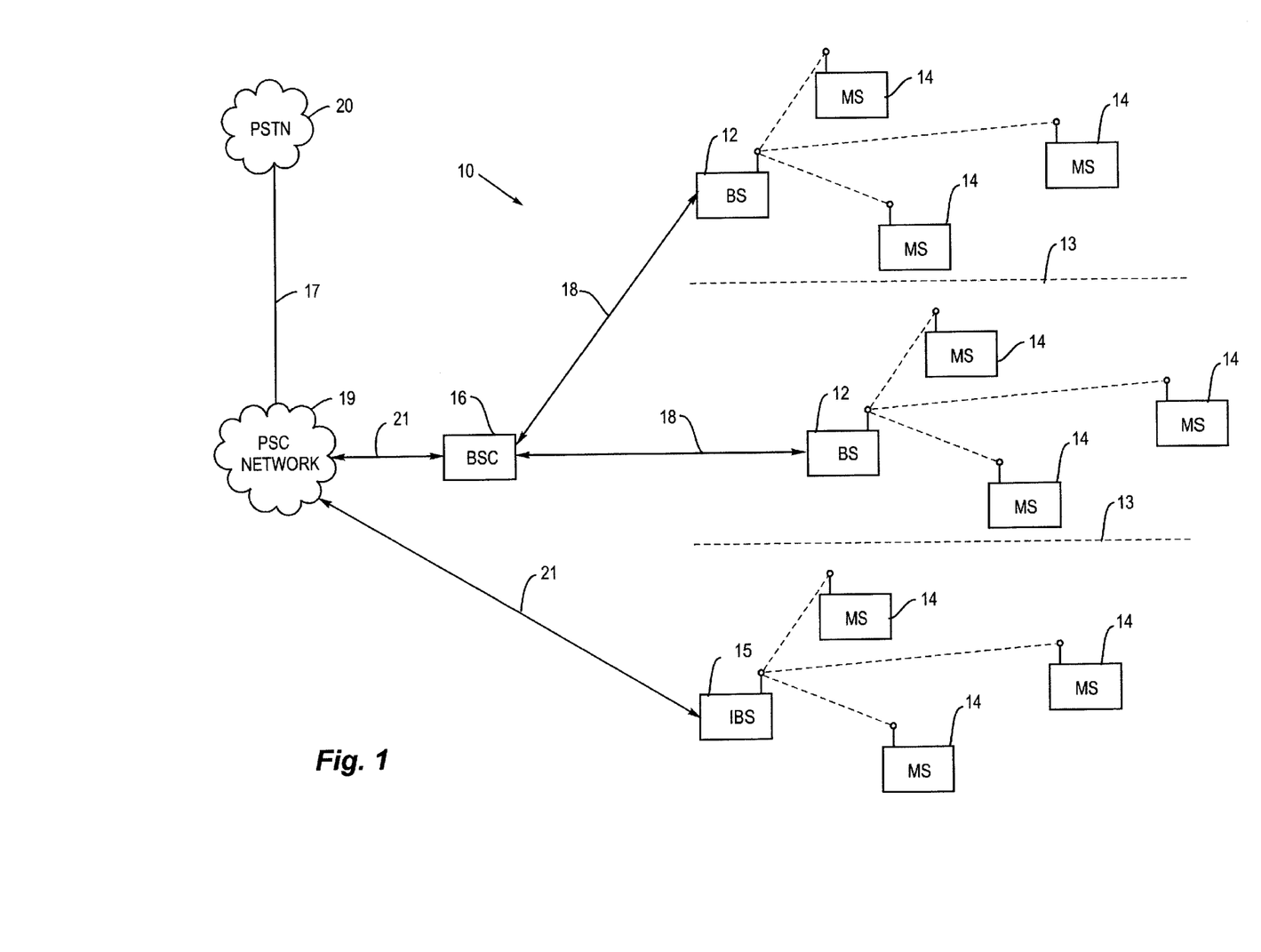
FIG. 1 is a block diagram of an exemplary wireless communication network connected to an overlay network, such as a public switched telephone network ("PSTN")

Referring to FIG. 1, an exemplary communication network 10 includes a plurality of base stations 12, which may include one or more intelligent base stations 15, wherein each base station 12 and intelligent base station 15 is located within a respective geographic cell defined by cell boundaries 13. A plurality of independent (activated) remote stations 14 are distributed throughout the network 10, with multiple remote stations 14 typically located in a particular geographic cell at any given instant. The remote stations may be mobile handsets or fixed customer premises remote units.

Both the base stations 12 and intelligent base station 15 and the remote stations 14 each preferably comprise a radio transmitter and receiver, and preferably communicate with one another using a combination of time division multiple access ("TDMA"), frequency division multiple access ("FDMA"), and code division multiple access ("CDMA") transmission techniques, respectively, preferably by employing a spread spectrum encoding format. For example, TDMA is preferably used to separate users within each geographic cell location. To provide greater area of coverage, or to provide greater capacity for densely populated regions, multiple or sectorized cells may be deployed using FDMA, thus separating cells by frequency. Further, to permit multi-cell deployments in a given region, a spread spectrum form of CDMA may be used for each RF link, (i.e., each over-the-air radio frequency signal link), in order to reduce co-channel interference between nearby cells using the same RF carrier frequency. Spread spectrum may advantageously improve system response to RF channel impairments. Both FDD and TDD may be employed with any of these multiple access techniques.

In particular, the respective base stations 12 and intelligent base station 15 are used to perform the requisite over-the-air radio transmission and reception to remote stations 14 located within its cell area, and will contain the equipment needed to communicate with the respective remote stations. In this regard, a base station 12 supports the over-the-air, terrestrial, and signaling links, respectively, necessary for linking a remote station 14 to an overlay network 20, such as, e.g., a public switched telephone network (PSTN) through PCS network infrastructure 19 via interface 17. A base station 12 is connected, via back haul lines 18, to a respective base station controller ("BSC") 16, which preferably controls the two-way transmissions of a plurality of base stations 12 in order to more efficiently provide certain operations such as, e.g., call handoffs between base stations and bearer data encoding and decoding, as well as general OAM&P ("operations, administration, maintenance & provisioning") support functions. An intelligent base station 15 is intended herein to describe a base station which incorporates the features of both a standard base station 12 and a base station controller 16, respectively, in a single unit. The respective base station controllers 16 and intelligent base stations 15, in turn, are connected to the overlay network 20 via further back haul lines 21. In a typical preferred embodiment, an overlay network 20 will be connected to a multitude of base stations 12, either by way of a (smaller) number of base station controllers 16 or directly, where intelligent base stations 15 are employed. The respective back haul lines 18 and 21 are preferably dedicated (e.g., private or leased public), two-way DS0, DS1 or DS3 level facilities, depending on the particular traffic load requirements of the specific portion of the communication network 10.

To communicate with multiple remote stations 14 in its respective geographic cell, each base station 12 and intelligent base station 15 preferably employs an over the air loop comprising a number of individual air channels, or time slots, wherein each time slot may be used by a remote station 14 to communicate with the respective base station 12 and intelligent base station 15. In accordance with a preferred communication protocol an FDD protocol such as that embodied in the GSM standards may be employed. In accordance with another preferred communication protocol, a time division duplexing ("TDD") transmission mode technique is preferably employed, whereby both downlink—i.e., in the base station to remote station transmission direction—and uplink—i.e., in the remote station to base station transmission direction—transmissions are carried over a common communication frequency path by employing time intervals for each respective signal transmission within a given time slot.

For example, in an exemplary preferred network embodiment employing a TDMA/TDD frame and time slot structure based on a 20 millisecond (ms) over the air loop and employing a 5.0 Mega "chip" per second (Mcps) transmission rate, the 20 ms over the air loop is equally divided between 32 full duplex channels, with each resulting time slot channel being capable of supporting 8 kbps full duplex digital data transmission between the respective base and remote stations. In yet another exemplary preferred embodiment, employing a 2.5 Mcps transmission rate, a 20 ms over the air loop is equally divided between 16 full duplex channels, with each resulting time slot channel being capable of supporting 9.6 kbps full duplex transmission between the respective base and remote stations. With either of the aforedescribed exemplary preferred embodiments, the first portion of each time slot channel is preferably allocated for a remote frame transmission, and the second portion is preferably allocated for a base station frame transmission, respectively. After each respective base or remote frame transmission, a portion of the time slot is preferably allocated to allow sufficient guard time for the transmitted signal to propagate back and forth to the respective receiver, e.g., based on the projected maximum geographic cell radius. In other words, even if there were perfect synchronization between respective base and remote station transmission intervals, a guard time is still preferred to minimize the possibility of received and transmitted signals overlapping in time due to the varying transmission distances and atmospheric conditions within the geographic cell location.

Preferably, any time slot in an over the air loop of a given base station 12 and intelligent base station 15 that is not already seized by a remote station 14 may contain a general poll command message transmitted by the respective base station 12 and intelligent base station 15 in that time slot's base station transmit interval. To acquire a time slot, a remote station 14 responds to a received general poll message in a remote station transmit interval. Upon receiving the response, the respective base station 12 and intelligent base station 15 may send specific poll messages in the next appearance of the same time slot in the over the air loop, which may preferably include a time slot (or time slots) assignment for communication between a remote station 14 and the base station 12 and intelligent base station 15, which may or may not be the same time slot used to transmit the general poll command message.

A preferred communication protocol is fully described in U.S. Pat. No. 5,781,593, filed on even date herewith, and owned by the assignee of the present invention, which is fully incorporated herein by reference in its entirety.

Figure 2:
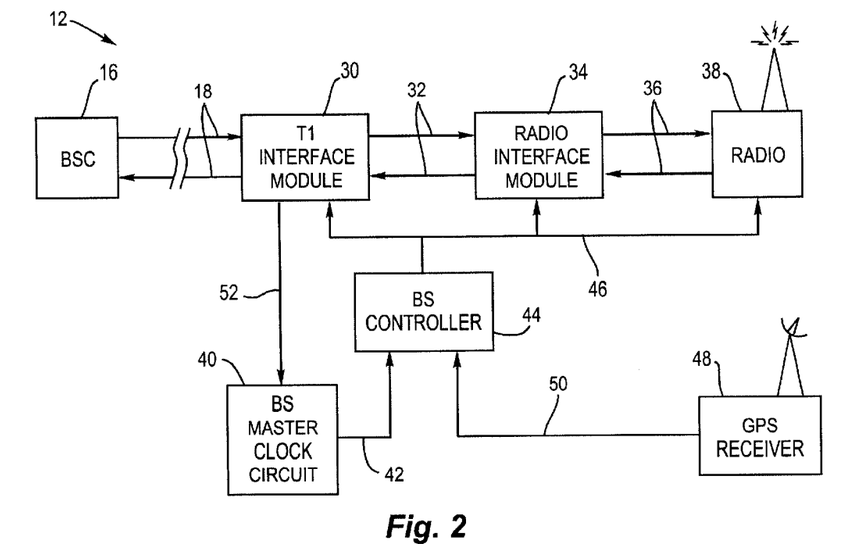
FIG. 2 is a block diagram of timing circuitry of a preferred base station.

Referring to FIG. 2, a preferred base station 12 includes a T1 interface module 30, which transmits and receives downlink and uplink digital data streams, respectively, and timing information from the network, to and from a respective base station controller 16 via T1 backhaul lines 18. In alternate preferred embodiments, the interface module 30 may be configured to support differing types of transmission rates or formats, such as, e.g., "E1", depending upon the employed network transmission protocol. The downlink and uplink digital data streams are transmitted to and from the T1 interface module 30 in a time-division multiplexed format, preferably in sequentially allocated over the air loop frames. In particular, each over the air loop frame comprises individual data channels, wherein each data channel contains a data frame corresponding to a respective time slot of the base station's over the air loop.

By way of example, in an exemplary preferred embodiment employing a TDMA/TDD frame and time slot structure based on a 20 ms over the air loop frame equally divided between 16 full duplex channels, and employing a 2.5 Mcps data transmission rate, a data frame comprising 192 bits of bearer data may be transmitted and received, respectively, during each time slot of the respective over the air loop. In addition to the bearer information, between 64 and 128 bits of signaling and control information may be included in each frame transmitted between the base station controller 16 and base station 12, respectively. Preferably sync bits are included in the signaling and control information for synchronizing the vocoders end to end as described in U.S. Pat. No. 5,781,593, filed on even date herewith, which is incorporated herein by reference.

A duplex data bus 32 preferably transmits the respective downlink and uplink information between the T1 interface module 30 and a radio interface module 34, respectively. The radio interface module 34 preferably includes a plurality of downlink and uplink data channel buffers for transitorily storing the data frame contained in each respective channel of one or more over the air loop frames, respectively, on an individual channel-by-channel or frame by frame, basis. In particular, in the downlink, or base station transmit direction, each over the air loop frame received over bus 32 from the T1 interface module 30 is parsed by the radio interface module 34 into respective downlink data channel buffers. Any signaling and/or control information not required for over-the-air transmission is preferably stripped off the data contained in each respective channel buffer, with the remaining bearer data frame in each respective channel sequentially transmitted over radio interface 36 and into radio 38, which transmits the information over-the-air preferably on a time slot by time slot basis, respectively, in accordance with the base station's over the air loop timing protocol.

Conversely, in the uplink, or remote station transmit direction, incoming data frames received by the base station from respective remote stations during the remote station transmit periods of the over the air loop are sequentially loaded into respective uplink channel buffers. The requisite signaling and control information for uplink backhaul transmission is then preferably added to the data frame in each respective uplink channel buffer and the successive data frames are sequentially moved from the radio interface module 34 over bus 32 to the T1 interface module 30, preferably forming a backhaul data frame for each respective over the air loop.

The base station 12 is provided with an adjustable base station master clock circuit 40, which generates a base station clock signal 42 for controlling the timing of the base station 12, e.g., at a frequency of 20 MHZ in a preferred embodiment for controlling a base station over the air loop of 20 ms. In a presently preferred embodiment the timing control link 46 transmits only timing control to the T1 interface module 30, both the 20 megahertz clock signal and timing control signals to the radio interface module 34 and only the 20 megahertz clock signal to the radio 38. Preferably the timing control signals to the T1 interface module comprises an interrupt signal that indicates that the data transmission for a particular slot is complete. Preferably the timing control signals sent to the radio interface module 34 comprise a transmit enable signal and an over the air loop strobe indicating the beginning of the over the air loop. In this embodiment the radio interface module 34 sends transmit and receive enable signals. The base station clock signal 42 is input to base station controller 44. The base station controller controls the data frame timing of the T1 interface module 30, radio interface module 34, and radio 38, respectively, over a timing control link 46. In particular, the base station controller 44 employs an internal counter for counting successive rising edges of the base station clock signal 42, to regulate data frame transmission and reception intervals of the base station's over the air loop.

By way of example, in an exemplary preferred embodiment, the master base station clock circuit 40 produces a 20 MHZ clock signal 42, which is input into the base station controller 44. The base station controller's internal counter detects rising edges of the 20 MHZ clock signal 42, and outputs data frame control signals over control link 46 for each time slot which, among other things, are used to trigger an incremental data frame transfer by the T1 module 30, radio interface module 34 and radio 38, respectively.

Each base station 12 of the preferred communication network 10 is preferably equipped with a global positioning system ("GPS") receiver 48, which delivers an accurate timing pulse 50 transmitted by a GPS satellite once every second. Upon reception and detection of the GPS timing pulse 50, the base station controller 44 determines whether the internal counter needs adjustment based upon the receipt of the timing pulse as related to a series of overlapping timing windows. If the timing pulse is received during a "no adjust" window, no adjustment is made. If the timing pulse falls outside the "no adjust" window but within a fine adjust window, the internal counter is incremented or decremented by one count. If the timing pulse falls outside the fine adjust window but within a coarse adjust window, the counter is incremented or decremented by multiple counts, preferably 3 to five counts. If it falls outside the coarse adjustment window the counter is reset to an initialized state.

The over the air loop frame timing of each base station 12 is thereby monitored every second,—e.g., every 50 over the air loop frame periods based on a preferred frame timing of 20 ms, depending on the accuracy of the GPS signal received at the various base station locations and the particular accuracy of the respective base station master clock circuits 40 within each one second interval. Based on the expected accuracy of known circuit elements, monitoring of the synchronization, and adjustment if necessary, every second, will minimize, if not eliminate, any problems arising from cross-transmission interference between base and remote stations in adjacent cells, which could otherwise occur by the drifting apart of their respective clock signals.

Figure 3:
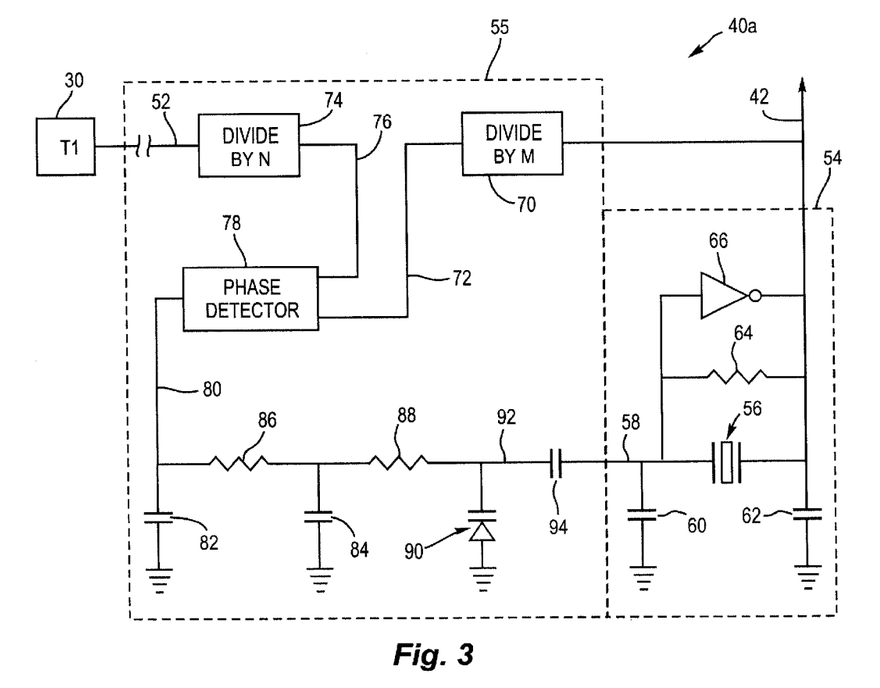
FIG. 3 is a schematic diagram of a preferred adjustable master clock circuit for use in a base or remote station.

Referring to FIG. 3, a first exemplary preferred embodiment 40*a* of a master base station clock circuit generally comprises a clock signal generation module 54 and a phase lock loop module 55, respectively. The clock signal generation module 54 includes a voltage sensitive oscillating crystal 56, preferably having a sufficiently high frequency to ensure an accurate timing pulse—e.g., a 20 MHZ oscillator is preferred for deriving a clock signal 42 of sufficient accuracy for controlling a 20 ms over the air loop frame.

Preferably the signal 58 input to the clock signal generation module 54 is connected to the oscillator 56 and to ground through capacitor 60. The other terminal of the oscillating crystal 56 is connected to ground through a second capacitor 62. A resistor 64 and inverter 66 are arranged in parallel with the oscillator 56.

The resulting base station clock signal 42 is fed back into the feedback-adjustment module 55. The phase lock loop module 55 includes a first dividing circuit 70, which divides the clock signal 42 into a substantially lower frequency component square wave signal 72, e.g., 4 KHz in a preferred embodiment. The phase lock loop module 55 receives an input reference clock signal 52 derived from the overlay network 20 at the T1 interface module 30, such as, e.g., an 8 KHz signal derived from the incoming T1 serial data rate over backhaul lines 18. The network reference clock signal 52 is fed into a second dividing circuit 74, which divides the network reference clock signal 52 into lower frequency component square wave signal 76 having the same frequency, e.g., 4 KHz, as the square wave component signal 72 derived from the base station clock signal 42. The two component square wave signals 72 and 76, respectively, are then compared to one another, e.g., in a digital X'OR phase detector 78, to obtain a differential comparison signal 80, representing the frequency/phase difference between the square wave 72 derived from the base station clock signal 42 and the square wave 76 derived from the network reference clock signal 52, respectively. The differential comparison signal 80 is shaped into an analog signal by a pair of RC circuits 82/86 and 84/88, respectively, and used as an input to a varactor tuning circuit 90. The varactor tuning circuit produces a responsive analog feedback voltage 92 corresponding directly to the signal level of the differential comparison signal 80. The feedback voltage 92 is coupled to an input 58 of the clock generation module 54 by a capacitor 94. Preferably the time constant of the varactor tuning circuit 90 is slow to prevent noise on the clock signal in that it slowly updates the master clock frequency.

Figure 4:
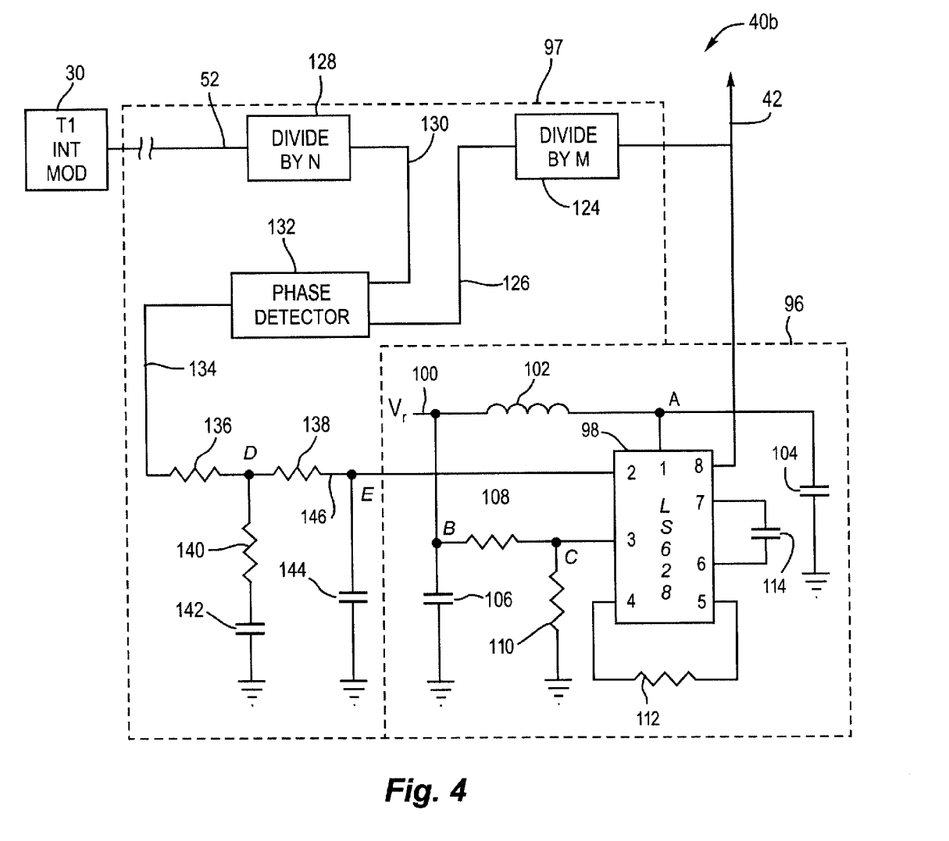
FIG. 4 is a schematic diagram of another preferred adjustable master clock circuit for use in a base or remote station.

Referring to FIG. 4, a second preferred embodiment 40b of the master base station clock circuit generally comprises a clock signal generation module 96 and a phase lock loop module 97, respectively. The clock signal generation module 96 employs a Texas Instruments model LS628 voltage controlled oscillator ("VCO") 98, which outputs a base station master clock signal 42 over an output pin 8, preferably having a sufficiently high frequency (e.g., 20 MHZ) for accurately controlling a 20 ms base station over the air loop. In particular, the base station clock signal 42 is generated by the VCO 98 by the following preferred input configuration:

A reference voltage $V_r$, from a source 100 is connected across an inductor 102 and input, via a first node "A", into VCO 98 input voltage pin 1. Node "A" is also connected to ground across a capacitor 104. The reference voltage $V_r$ is also connected, via a pair of additional nodes "B" and "C", respectively, across a resistor 108 and input into VCO 98 input voltage pin 3. Node "B" is also connected to ground across a capacitor 106, and node "C" is connected to ground across a resistor 110, respectively. A resistor 112 is connected across pins 4 and 5, and a capacitor 114 is connected across pins 6 and 7, respectively, of the VCO 98.

The resulting base station clock signal 42 of clock circuit 40b is fed back into the phase lock loop module 97. The phase lock loop module 97 includes a first dividing circuit 124, which divides the clock signal 42 into a substantially lower frequency component square wave signal 126, e.g., 4 KHz in a preferred embodiment. The feedback module 97 also receives an input reference clock signal 52 derived from the overlay network 20 at the T1 interface module 30, such as, e.g., an 8 KHz signal derived from the serial data rate of the incoming T1 signals carried over backhaul lines 18. The network reference clock signal 52 is fed into a second dividing circuit 128, which divides the network reference clock signal 52 into lower frequency component square wave signal 130 having the same frequency (e.g., 4 KHz) as the square wave component signal 126 derived from the base station clock signal 42. The two component square wave signals 126 and 130 are then compared to one another, e.g., by a digital X'OR phase detector 132, to obtain a differential comparison signal 134, representing the phase differences between the square wave 126 derived from the base station clock signal 42 and the square wave 130 derived from the network reference clock signal 52, respectively.

The differential comparison signal 134 is then passed through a pair of resistors 136 and 138, wherein a node "D" located between resistors 136 and 138 is also connected to ground through a resistor 140 and capacitor 142, respectively. The resulting signal 146 is connected, via node "E", to VCO 98 voltage input pin 2. Node "E" is also connected to ground through a capacitor 144.

Figure 5:
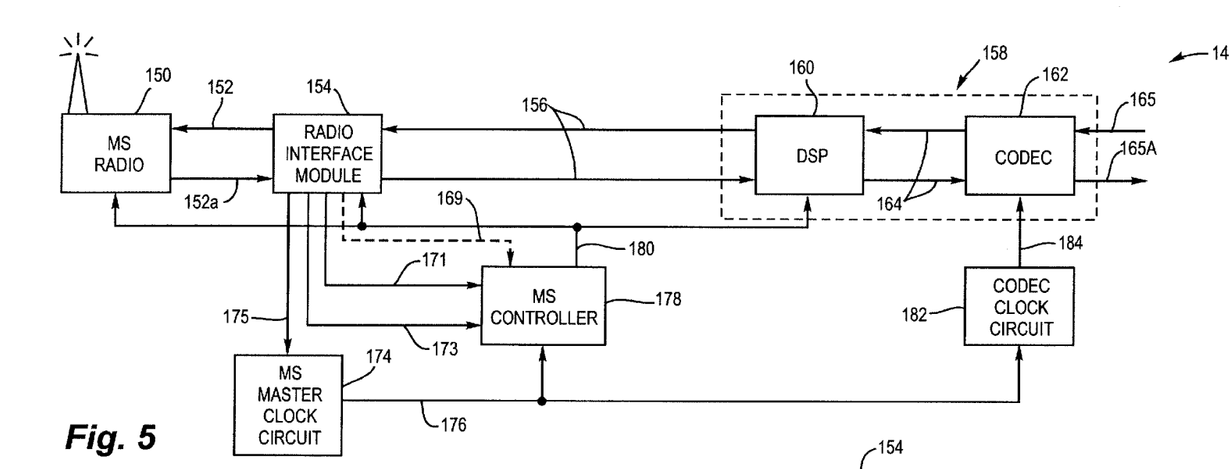
FIG. 5 is a block diagram of the timing circuitry of a preferred mobile station.

Referring to FIG. 5, a preferred mobile station 14 includes a radio 150 for transmitting and receiving over-the-air (OTA) signals preferably in the form of RF modulated digital data frames to and from respective base stations 12. The radio 150 is linked via a parallel receive data bus 152 and a serial transmit interface 152a to a radio interface module 154, which includes digital data filter and correlation circuitry for handling incoming data frames received from a base station 12. The radio interface module 154 is linked via a full duplex serial interface 156 to a mobile station vocoder module 158, which includes a digital signal processing ("DSP") unit 160 and a voice code-decode ("CODEC") unit 162, respectively. The CODEC unit 162 transmits and receives digitally sampled voice signals at 8 KHz (i.e., every 125 micro-seconds), over a two-way voice path 164 and outputs and receives an analog voice signal on lines 165 and 165a. The DSP unit 160 performs the requisite data handling of the respective incoming and outgoing data frames, including necessary compression and decompression of the incoming information.

The mobile station 14 is provided with an adjustable mobile station master clock circuit 174, which generates a mobile station clock signal 176 having the same frequency as the respective base stations 12 of the communication network 10 for controlling the timing of the respective mobile station 14 data transmission operations. In a preferred embodiment, the mobile station master clock circuit 174 is preferably configured substantially identical to the base station master clock circuit 40, e.g., as depicted in FIGS. 3 and 4, except that its output frequency is adjusted by a pulse width modulator 172 (depicted in FIG. 6) based upon successive incoming base station transmissions, which generates a pulse width modulated control signal 175.

The mobile station clock signal 176 is used as an input clock for remote station controller 178. The remote station controller 178 employs a timing counter for counting successive rising edges of the mobile station clock signal 176, which information is used to regulate the transmit and receive timing periods of the mobile station 14 within one or more acquired base station 12 time slots. The remote station controller 178 controls the data transmission timing of the DSP unit 160, radio interface module 154, and radio 150, respectively, through control signals transmitted over a timing control link 180, which signals include the output of the timing counter in the mobile station controller.

The mobile station master clock signal 176 is also used as a reference clock for synchronizing an adjustable CODEC clock circuit 182. By way of example, a preferred mobile station 14 employing a 20 MHZ master clock 174 to control the mobile station data transmission operations in a 20 ms over the air loop, also employs a 24.576 MHZ or other even multiple clock 182 to derive a stable 2.048 MHZ CODEC timing signal 184 for controlling 8 KHz digital voice sampling operations. Again, in a preferred embodiment, the CODEC clock circuit 182 is preferably configured substantially identical to the base station master clock circuit 40, e.g., as depicted in FIGS. 3 and 4, except that its output frequency is synchronized (at a serial data rate) with the mobile station's clock signal 176. As with the comparison circuitry of the phase lock loop modules 55 and 97 of FIGS. 3 and 4, respectively, the synchronization of the CODEC clock timing signal 184 to the mobile station clock signal 176 is preferably performed by first dividing each of the respective signals into a (much lower) common frequency square wave component signal, e.g., 4 KHz. The respective 4 KHz square waves are then compared and the output frequency of the CODEC clock circuit 182 is adjusted accordingly. In this way the mobile station CODEC frequency may be locked to the mobile station's master clock frequency, even though the two clocks output different frequency signals.

Figure 6:
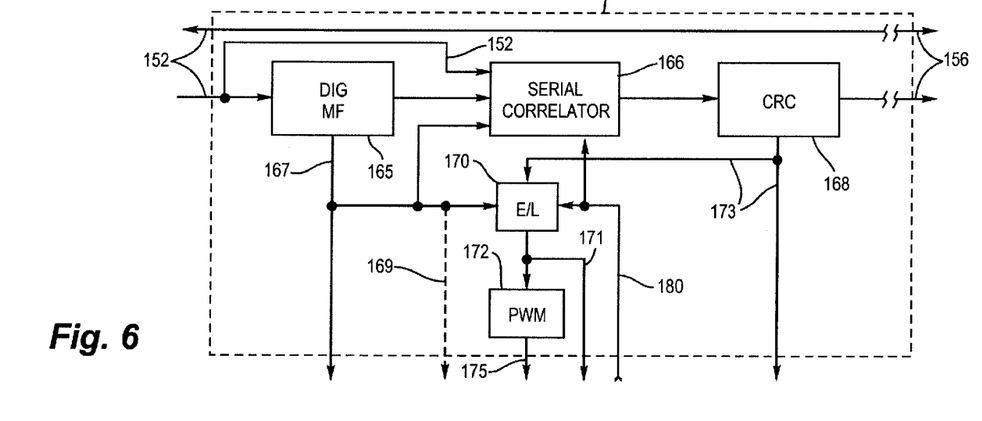
FIG. 6 is a block diagram of a preferred remote station radio interface module.

Referring to FIG. 6, a mobile station 14 seeking to initiate contact with a base station 12 begins searching over-the-air transmissions for a general polling signal sent by a base station 12 within transmission range of the mobile station 14. In particular, the remote station 14 analyzes incoming signals received by its radio 150 to find a respective base station general polling signal. As more fully described in U.S. Pat. Nos. 5,648,982 and 5,757,847, assigned to the assignee of the present application and which are hereby fully incorporated herein by reference, the first n bits of a received signal are serially loaded into a digital matched filter circuit 165 in the radio interface module 154, where n corresponds to a selected length of a proprietary base station preamble. The n bits of data are then compared against one or more stored preamble bit-patterns in the matched filter circuit 165, while the remaining m bits of the received data transmission are loaded into many, preferably 32, serial digital correlators 166.

If a match between the received n-bit preamble and a stored n-bit pattern is detected, the matched filter circuit 165 produces a timing pulse 167, which substantially corresponds to a known position of the respective transmitting base station's frame counter. The timing pulse causes the serial correlators 166 to extract the received m-bits of data comprising the base station's general polling signal frame, which is preferably checked for accuracy—e.g., by employing a known error-check methodology such as a CRC process 168—and, if the received data frame is correct within a selected margin of error, a CRC verification signal 173 is input to the early/late detector 170 and the mobile station controller 178. The early/late detector 170 compares the output of the mobile station controller 178 timing counter appearing on link 180 to generate an adjustment signal 171 which is input to the pulse width modulator 172 and the mobile station controller 178. Upon reception of the adjustment signal 171, the mobile station controller 178 sets its timing counter to an initialized state. In this manner, the mobile station controller 178 is synchronized with the over the air loop timing of the respective transmitting base station. The pulse width modulated control signal 175 is input to the mobile station master clock circuit 174.

Figure 7:
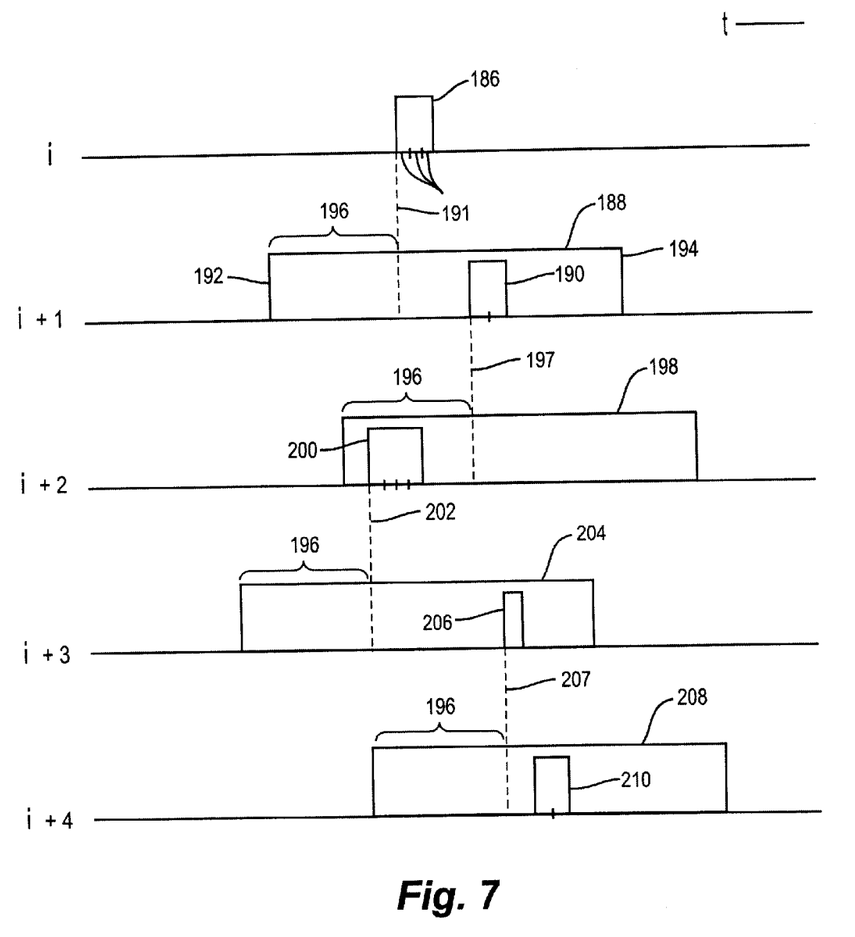
FIG. 7 illustrates a timing window of a preferred mobile station radio interface module.

In particular, as seen in FIGS. 5–7, the mobile station controller 178 is initialized by a first timing pulse 169 generated from a preamble match detection on an initially received base station polling signal data frame 186; (shown as occurring at t=I in FIG. 7, where t represents an arbitrary over the air loop interval of a respective base station). At t=I+1, the remote station controller 178 establishes an initial timing window 188 for the serial correlator 166 to receive a specific poll message 190 from the respective base station, preferably in the base station transmit portion of the same over the air loop time slot in which the general polling signal was received. The timing window 188 preferably has a fixed length of sufficient duration to allow for receiving the expected base station specific poll transmission 190 in the expected time slot interval, while not being so long as to extend beyond the guard time in either direction and inadvertently receive spurious transmissions from other base or mobile stations in bordering time slot intervals.

In accordance with a preferred communication protocol, cell boundaries 192, 194 for the initial timing window 188 are selected based on the leading edge 191 of the initially received general polling frame 186, which corresponds to the timing pulse 167. In particular, the lead cell boundary 192 of the timing window 188 is established by subtracting a fixed early arrival zone 196 from the over the air loop timing by the timing counter of the mobile station controller 178.

To maintain synchronization between the respective mobile and base stations during an established communication link, each successive base station data frame transmission preferably includes a preamble. The matched filter circuit 165 continues to produce a timing pulse 167 upon detecting each received preamble. Each successive timing pulse 167 is input into an early/late comparator circuit 170, and compared with the expected arrival time based on the timing counter output of the mobile station controller 178 appearing on the link 180. The early/late comparator circuit 170 sends an adjustment signal 171 to the mobile station controller 178, which directly adjusts the timing counter for establishing a subsequent timing window by adding or subtracting one or more clock pulses to the timing count to either accelerate or delay, respectively, the appearance of the next timing window.

For example, a timing window 198 for receiving a base station transmission 200 at t=I+2 is established based on the leading edge 197 of the previously received base station message frame 190, i.e., received at t=I+1. If frame 190 was received "late" (as shown in FIG. 7), the total count required for establishing window 198 is increased by a single clock cycle, as calculated by the early/late comparator circuit 170. Conversely, if frame 190 was received "early" (as is shown for subsequent frame 200 in FIG. 7), the total count required for establishing window 198 is decreased by a single clock cycle as calculated by the early/late comparator circuit 170. A timing window 204 for receiving a base station transmission 206 at t=I+3 is established based on the leading edge 202 of the previously received base station message frame 200, and so on. This process continues throughout the duration of an established link.

Referring again to FIG. 5, the base station timing pulses are also used to continually adjust the output frequency of the mobile station master clock circuit 174. In one preferred embodiment, the mobile station clock frequency is controlled in a manner similar to the continual synchronization of the base station master clock circuit 174 to the overlay network 20. The difference between the two is that the digital input to the varactor control of the crystal oscillator circuit is preferably the pulse width modulated signal 175 whose duty cycle is adjusted by the pulse width modulator 172 based upon the adjustment signal 171 from the early late detector 170.

The respective base and mobile station transmissions are thereby further prevented from encroaching beyond the guard time gaps following each respective time slot transmission interval, as may otherwise occur from a drift in one or both of the respective clock signal frequencies. Preferably, early/late adjustments to the mobile station's controller counter and master clock frequency are only made based on timing pulses 167 received in base station transmission frames which pass an error check, e.g., upon receiving a "CRC" verification signal 173, to ensure no false adjustments are made. An advantage of the aforedescribed preferred embodiment is that the mobile station master clock circuit 174 need only be initially accurate enough to detect an initial preamble match and perform a successful CRC routine. Once a match is made, the respective base station and mobile station clocks are locked by the aforedescribed synchronization adjustments. If a mobile station 14 stops receiving transmissions from the respective base station 12 in the acquired, or later assigned time slot, the mobile station master clock 174 is no longer adjusted and thereafter remains at its last setting until communication with the same, or another base station 12 takes place.

Thus, methods and network architectures for the acquisition and maintenance of synchronization between components of a mobile communication network have been disclosed, including network-wide, intra-base station, base station to mobile station, and intra-mobile station synchronization, respectively. While the foregoing present inventions are particularly well suited for a mobile communication network, it will be apparent to those skilled in the art that the described methods and network architectures can be effectively practiced with any communication network, and is particularly well suited for communication networks employing asynchronous transfer mode (ATM) communications.

By way of example only, the disclosed synchronization methods and network architectures could be employed in a burst-mode data packet transmission network, wherein recovery of, and ongoing synchronization to, an underlying TDMA data cell transmission clock is required on the receiving end of a transmission link.

As would be apparent to those skilled in the art, many more modifications are possible without departing from the inventive concepts herein. The inventions, therefore, are not to be restricted except in the spirit of the appended claims.

We claim:

1. A communication network, comprising:
    a base station, said base station comprising
        an adjustable base station oscillator circuit outputting a base station clock signal,
        base station clock circuitry for adjusting said base station oscillator circuit, and
        base station transmission circuitry for transmitting over the air, based on the base station clock signal, a preamble; and
    a mobile station, said mobile station comprising
        an antenna for receiving the preamble transmitted by said base station,
        mobile station circuitry for detecting the preamble and generating a base station timing signal upon detection of the preamble,
        an adjustable mobile station oscillator circuit outputting a mobile station clock signal,
        a mobile station controller outputting a controller signal comprising a timing count based on the mobile station clock signal; and
        mobile station clock circuitry for generating an adjustment signal to adjust said mobile station controller, the adjustment signal determined by the base station timing signal and the controller signal.

2. The communication network of claim 1, said base station further comprising interface circuitry for generating a reference clock signal derived from a reference network.

3. The communication network of claim 2, said base station further comprising
    a first dividing circuit for deriving a lower frequency component signal from the base station clock signal,
    a second dividing circuit for deriving a lower frequency component signal from the reference clock signal, and
    circuitry for comparing the lower frequency component signal from the base station clock signal with the lower frequency component signal from the reference clock signal and generating a corresponding reference signal comparison output signal.

4. The communication network of claim 3, wherein said base station clock circuitry for adjusting said base station oscillator circuit comprises a varactor tuning circuit which supplies a voltage across said base station oscillator circuit directly proportional to the reference signal comparison output signal.

5. The communication network of claim 3, wherein said circuitry for comparing the lower frequency component signal from the base station clock signal with the lower frequency component signal from the reference clock signal comprises an XOR circuit.

6. The communication network of claim 2, wherein the reference clock signal is derived from a public switched telephone network.

7. The communication network of claim 2, wherein said adjustable base station oscillator circuit comprises a voltage sensitive 20 MHZ crystal and the reference clock signal comprises an 8 KHZ signal supplied by a public switched telephone network.

8. The communication network of claim 1, said mobile station further comprising circuitry for generating a vocoder clock signal synchronized to the mobile station clock signal.

9. The communication network of claim 8, wherein said circuitry for generating the vocoder clock signal comprises an adjustable timing oscillator circuit.

10. A method of synchronizing a base station and a remote station in a communication network, comprising:
    generating timing information in the form of a periodically transmitted preamble at a base station;
    transmitting the timing information over the air from the base station to the remote station;
    generating a clock signal at the remote station;
    comparing the timing information and the clock signal at the remote station;
    adjusting the clock signal without reference to an external clock, based on said comparing of the timing information and the clock signal;
    comparing a base station clock signal used in said generating timing information with a reference clock signal derived from a reference network;
    adjusting the base station clock signal based on the reference clock signal;
    receiving periodic GPS pulse signals at the base station; and resetting a signal frame transmission cycle derived from the base station clock signal based upon receipt of a GPS pulse signal.

11. A method of synchronizing communication signals sent over the air between a base station and a remote station in a communication network, comprising:

generating a first clock signal at the base station;

comparing the first clock signal with a reference clock signal derived from a GPS network;

adjusting the first clock signal based on the reference clock signal;

transmitting a message from the base station to the remote station;

deriving the adjusted first clock signal at the remote station based upon receipt of the message from the base station;

generating a second clock signal at the remote station; and adjusting the second clock signal based on the derived first clock signal without reference to an external clock.

12. The method of synchronizing communication signals of claim 11, wherein the message transmitted from the base station comprises a preamble, and wherein the adjusted first clock signal is derived by detecting the preamble at the remote station with a digital matched filter circuit which produces a matched filter detect pulse.

13. A method of synchronizing communication signals sent over the air between stations of a communication network, comprising:

generating a first clock signal at a first station;

operating a first communication circuitry at the first station according to a first station frame transfer cycle matching the first clock signal;

comparing the first clock signal with a reference clock signal derived from a reference network;

adjusting the first clock signal based upon the reference clock signal;

transmitting a communication signal from the first station;

generating a second clock signal at a second station;

operating a second communication circuitry at the second station according to a second station frame transfer cycle matching the second clock signal;

receiving the communication signal transmitted from the first station at the second station;

deriving the adjusted first clock signal at the second station upon receiving the communication signal transmitted from the first station at the second station; and adjusting the second clock signal on the second station, based upon the derived adjusted first clock signal, without reference to an external clock.

14. The method of synchronizing communication signals of claim 13, wherein the reference network is a GPS network.

15. The method of synchronizing communication signals of claim 13, wherein the reference network is a public switched telephone network.

16. A communication network, comprising:

a base station comprising a base station radio comprising a base station radio input and a base station radio output, and a base station clock circuit comprising a base station clock circuit output comprising a base station clock signal, the base station clock signal comprising said base station radio input, said base station radio output comprising a message comprising a plurality of bits, the message transmitted over the air at a time based on the base station clock signal; and a remote station comprising a remote station radio comprising an antenna for receiving the message, a remote station module comprising a matched filter circuit comprising an input comprising one or more of the plurality of bits of the message and comprising an output comprising a base station timing signal, and an early/late detector comprising an input comprising the base station timing signal and comprising an output comprising an adjustment signal, and a remote station clock comprising an input based on the adjustment signal and comprising an output comprising a remote station clock signal.

17. The communication network of claim 16, wherein the message comprises a preamble.

18. The communication network of claim 16, wherein said first remote station circuitry for generating the base station timing signal comprises a digital matched filter circuit which produces a matched filter detect pulse indicative of the base station clock signal.

19. The communication network of claim 16, wherein said remote station clock comprises an adjustable oscillator circuit.

20. The communication network of claim 19, wherein the frequency of the remote station clock signal varies according to a change in a voltage applied across said adjustable oscillator circuit.

21. The communication network of claim 19, wherein said remote station clock further comprises a varactor tuning circuit which applies a variable voltage across said adjustable oscillator circuit.

22. The communication network of claim 19, wherein the remote station module comprises a digital matched filter for generating the base station timing signal based on receipt of one or more of the plurality of bits of the message, an early/late detector comprising an input comprising the base station timing signal and an output comprising the remote station timing control signal, and a pulse width modulator comprising an input comprising the remote station timing control signal and an output comprising a pulse width modulated signal.

23. The communication network of claim 16, wherein said base station further comprises a GPS receiver, and wherein the base station clock signal is compared to a reference clock signal received by said GPS receiver and the base station clock signal is adjusted based on the comparison of the base station clock signal to the reference clock signal.

* * * * *

UNITED STATES PATENT AND TRADEMARK OFFICE
CERTIFICATE OF CORRECTION

PATENT NO. : 6,243,372 B1
DATED : June 5, 2001
INVENTOR(S) : Bryan K. Petch et al.

It is certified that error appears in the above-identified patent and that said Letters Patent is hereby corrected as shown below:

<u>Title page,</u>
Item [73], please change the name of the Assignee to -- Xircom Wireless, Inc. --

<u>Column 9,</u>
Line 8, please change "feedback adjustment module 55" to -- phase lock loop module 55 --
Line 66, please change "feedback module 97" to -- phase lock loop module 97 --

Signed and Sealed this

Tenth Day of September, 2002

Attest:

Attesting Officer

JAMES E. ROGAN
*Director of the United States Patent and Trademark Office*